United States Patent [19]

Krueger

[11] 4,156,678
[45] May 29, 1979

[54] THERMOSETTING COATING COMPOSITION OF AN ORGANIC POLYISOCYANATE, A POLYMER HAVING PENDENT HYDROXYL CONTAINING ESTER GROUPS, AND A RHEOLOGY CONTROL AGENT

[75] Inventor: Achim R. Krueger, Cherry Hill, N.J.

[73] Assignee: E. I. Du Pont de Nemours and Company, Wilmington, Del.

[21] Appl. No.: 767,061

[22] Filed: Feb. 9, 1977

Related U.S. Application Data

[63] Continuation-in-part of Ser. No. 581,712, May 29, 1975, abandoned.

[51] Int. Cl.² .................. C08K 3/36; C08L 33/20; C08L 75/06
[52] U.S. Cl. .................. 260/42.37; 260/37 N; 260/859R
[58] Field of Search ............... 260/37 N, 42.37, 859 R

[56] References Cited

U.S. PATENT DOCUMENTS

| | | | |
|---|---|---|---|
| 3,558,564 | 1/1971 | Vasta | 260/77.5 |
| 3,895,082 | 7/1975 | Hochberg | 260/875 |
| 3,984,497 | 10/1976 | Owens | 260/859 R |

OTHER PUBLICATIONS

*Handbook of Reinforced Plastics,* Olessky et al. (1964) p. 203.
*Condensed Chemical Dictionary,* 5th ed., A & E Rose, eds., (1956) p. 195.
*Condensed Chem. Dict.,* 5th ed., A & E Rose, eds. (1956) p. 119.

*Primary Examiner*—Sandra M. Person

[57] ABSTRACT

A thermosetting coating composition, of controlled rheology, of a urethane polymer that cures into a durable, flexible coating is the subject of this invention; the film-forming constituents of the coating composition are (1) an organic polyisocyanate, and
(2) a polymer that has a backbone of polymerized ethylenically unsaturated monomers and has attached directly to its backbone ester groups of the following structure.

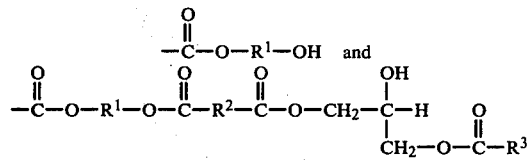

or an isomer thereof, wherein $R^1$, $R^2$ and $R^3$ are hydrocarbon radicals; and the rheology control agents are fumed silica, attapulgus clay, copolymers of acrylonitrile/methyl acrylate of high nitrile content, modified microgels and the like. This novel coating composition is particularly useful, especially when applied over zinc rich primers, as a high quality industrial finish and can be used to paint autos, trucks, aircraft, railway equipment and the like.

17 Claims, No Drawings

THERMOSETTING COATING COMPOSITION OF AN ORGANIC POLYISOCYANATE, A POLYMER HAVING PENDENT HYDROXYL CONTAINING ESTER GROUPS, AND A RHEOLOGY CONTROL AGENT

CROSS-REFERENCE TO RELATED APPLICATION

This is a continuation-in-part of application Ser. No. 581,712, filed May 29, 1975, now abandoned.

BACKGROUND OF THE INVENTION

This invention relates to a novel coating composition, of controlled rheology, of a polyurethane polymer of polyisocyanate and a polymer having pendent hydroxyl containing ester groups and a rheology control agent.

Polyurethane compositions are known in the art and have been used as coating compositions, adhesives, molded into articles by conventional techniques and made into foamed products. Typical polyurethanes of a hydroxyl containing polymer and a polyisocyanate are shown in O'Brien U.S. Pat. No. 3,028,367, issued Apr. 3, 1962; Horvath U.S. Pat. No. 3,284,415, issued Nov. 8, 1966, Mayer et al. U.S. Pat. No. 3,245,941, issued Apr. 12, 1966 and British Pat. No. 1,100,386, published Jan. 24, 1968. These prior art compositions form useful products but are not economical, rapid cure compositions which give a coating with excellent appearance and adhesion to substrates, toughness and flexibility as is required by industry for coatings on trucks, airplanes, railway equipment and the like. A coating composition, described in Vasta, U.S. Pat. No. 3,558,564, issued Jan. 26, 1971, has these excellent properties which are provided by the combination of a unique hydroxy containing polymer and an organic polyisocyanate but is difficult to apply in thick films directly over prevalent zinc rich primers without surface imperfections.

The coating composition of this invention overcomes this problem by virtue of its controlled rheology and provides coatings for exterior and interior surfaces that are exposed to corrosive environments and to severe weather.

SUMMARY OF THE INVENTION

An improved thermosetting coating composition of controlled rheology containing 5–60% by weight of a polymer blend and a solvent for the polymer blend in which the blend consists essentially of (I) an organic polyisocyanate, and (II) a polymer that has a backbone of polymerized ethylenically unsaturated monomers and has ester groups attached directly to its backbone; these ester groups comprise about 10–75% of the total weight of the polymer and consist essentially of Ester Group (A)

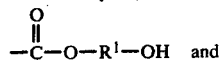

and
Ester Group (B) which is either

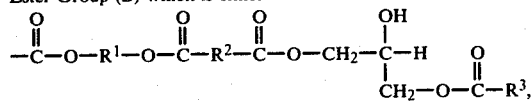

-continued

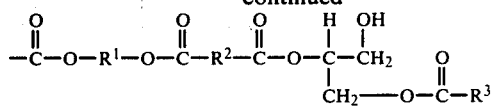

or a mixture of these groups; wherein the molar ratio of Ester Group (A) to Ester Group (B) is from about 1:1.5 to 1:2.5; and wherein $R^1$ is saturated hydrocarbon radical having 2–10 carbon atoms, $R^2$ is selected from the group consisting of alkylene, vinylene, aromatic, carbocyclic, and heterocyclic radicals, and $R^3$ is selected from the group consisting of a saturated aliphatic hydrocarbon radical having 1 to 26 carbon atoms and an ethylenically unsaturated aliphatic hydrocarbon radical having 12 to 18 carbon atoms, wherein the improvement comprises:

0.1–30% by weight, based on the weight of the coating composition, of a rheology control agent selected from the group consisting of fumed silica, copolymers of acrylonitrile and methyl acrylate, attapulgus clay, and a modified microgel.

The inorganic rheology control agents have a nominal particle size of less than 1 micron.

DESCRIPTION OF THE INVENTION

The controlled rheology coating composition of this invention is prepared by blending an organic polyisocyanate with a polymer having hydroxyl containing ester groups and a rheology control agent. A reaction catalyst can be blended with the composition to decrease the curing time.

A variety of organic polyisocyanates can be used in the novel coating composition of this invention including aliphatic, cycloaliphatic, alkaryl, aralkyl, heterocyclic and aryl polyisocyanates. Typically useful polyisocyanates are, for example, diphenylmethane-4,4'-diisocyanate, diphenylene-4,4'-diisocyanate, toluene-2,4-diisocyanate, toluene-2,6-diisocyanate, 3,3'-dimethoxy-4,4'-diphenylene diisocyanate, methylene-bis-(4-cyclohexyl isocyanate), tetramethylene diisocyanate, hexamethylene diisocyanate, decamethylene diisocyanate, ethylene diisocyanate, ethylidene diisocyanate, propylene-1,2-diisocyanate, cyclohexylene-1,2-diisocyanate, m-phenylene diisocyanate, p-phenylene diisocyanate, 1,5-naphthalene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, furfurylidene diisocyanate, bis-(2-isocyanatoethyl)fumarate, 1,3,5-benzene triisocyanate, para,para',para''-triphenylmethane triisocyanate, 3,3'-diisocyanatodipropyl ether, xylene diisocyanate, β,β-diphenyl propane-4,4'-diisocyanate.

The product of one of the above isocyanates with a deficient amount of low molecular weight alcohol, such as 1,4-butane diol, glycerine, trimethylolpropane, hexane diols and triols may be used as a polyisocyanate in the coating composition of this invention. One preferred polyisocyanate of this type is the reaction product of toluene diisocyanate and trimethylolpropane. These polyisocyanates can be made according to Bunge et al., U.S. Pat. No. 2,855,421, issued Oct. 7, 1958.

Another preferred polyisocyanate is a biuret of the formula:

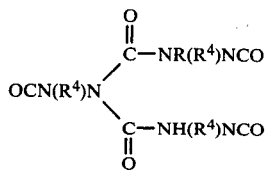

wherein $R^4$ is a divalent aliphatic hydrocarbon group having 1-12 carbon atoms. One particularly preferred biuret, since it forms a high quality coating, is "Desmodur" sold by Farbenfabriken Bayer, AG in which $R^4$ is a saturated straight chain divalent hydrocarbon group having 6 carbon atoms. These biurets can be made according to Mayer et al. U.S. Pat. No. 3,245,941, issued Apr. 12, 1966.

A hydroxy containing polymer and a rheology control agent are blended with the aforementioned polyisocyanate to form the novel coating composition of this invention. The polymer has pendent hydroxyl containing ester groups which react with the polyisocyanate to form a durable, tough polyurethane coating. The rheology control agent can form a loose structure within the coating to allow it to cover surface imperfections of a substrate to be coated. This can prevent bubble formation in the coating.

A wide variety of ethylenically unsaturated monomers can be used to prepare the backbone of the hydroxyl containing polymer used to form the coating composition of this invention. Typical monomers that can be used for the backbone are, for example, vinyl chloride, vinylidene chloride; olefins, such as ethylene, propylene and the like; vinyl acetate; conjugated dienes having 4 to 10 carbon atoms, such as butadiene; aromatic hydrocarbons having vinylene groups, such as styrene, alkyl substituted styrene, such as α-methyl styrene; alkyl maleates, such as dibutyl maleate; vinyl pyrrolidone; methacrylonitrile, acrylonitrile; esters of methacrylic acid and acrylic acid, preferably alkyl esters having 1-12 carbon atoms in the alkyl group, such as methyl methacrylate, ethyl methacrylate, propyl methacrylate, butyl methacrylate, hexyl methacrylate, 2-ethylhexyl methacrylate, lauryl methacrylate and the like, methyl acrylate, ethyl acrylate, propyl acrylate, butyl acrylate, hexyl acrylate, lauryl acrylate and the like or mixtures of these monomers. Small amounts of ethylenically unsaturated carboxylic acids can also be used in the backbone, such as acrylic acid, methacrylic acid, crotonic acid, itaconic acid, maleic acid, and the like.

Particularly useful monomers or combinations of monomers which form the backbone of high quality polymers used to form the coating composition of this invention are, for example, styrene, methyl methacrylate, butyl methacrylate, ethyl acrylate, acrylonitrile, and vinyl pyrrolidone.

Ester Group (A) of the polymer used in this invention is provided by a hydroxyalkyl substituted vinyl monomer, such as a hydroxyalkyl methacrylate, a hydroxyalkyl acrylate, a hydroxyalkyl maleate, hydroxyalkyl itaconate, or a mixture of these in which the alkyl group contains 2-10 carbon atoms. The hydroxyalkyl monomer is polymerized with the aforementioned backbone monomers.

Preferred hydroxyalkyl monomers used for forming the polymer used in this invention are, for example, hydroxyethyl methacrylate, hydroxypropylemethacrylate, hydroxybutyl methacrylate, hydroxyoctyl methacrylate, hydroxyethyl acrylate, hydroxypropyl acrylate, hydroxybutyl acrylate, hydroxyoctyl acrylate and the like. Preferred are hydroxyalkyl methacrylates or acrylates in which the alkyl groups contain 2-4 carbon atoms.

Ester Group (B) is the esterification product of the aforementioned hydroxyalkyl monomers, an anhydride of a dicarboxylic acid, and a glycidyl ester. This ester group is polymerized into the polymer backbone through the ethylenic unsaturation of the aforementioned hydroxyalkyl monomers.

The anhydride used for forming Ester Group (B) has the formula

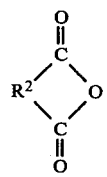

wherein $R^2$ is either alkylene, vinylene, aromatic, carbocyclic or a heterocyclic radical. The anhydride reacts with the hydroxyalkyl monomer and also reacts with the glycidyl ester to form Group (B).

Anhydrides useful in this invention in which $R^2$ is an alkylene group are formed from dicarboxylic acids of the general formula $(CH_2)_n(COOH)_2$ where n is from 2-10. Typical dicarboxylic acids of this group are glutaric, adipic, pimelic, succinic acids and the like. The preferred is an anhydride of succinic acid.

Useful anhydrides in which $R^2$ is a vinylene group are derived from dicarboxylic acids of the general formula $$C_n H_{2n-4} O_4$$

wherein n is from 4-10. Typical dicarboxylic acids of this group are maleic and itaconic acids.

Another group of useful anhydrides are derived from dibasic aromatic acids, such as phthalic acid, uvitic acid and cumidinic acid. Often it is desirable to use a halogen substituted anhydride of one of the above aromatic dicarboxylic acids, such as tetrabromophthalic anhydride. Halogen substituted anhydrides in which the halogen substituent is either chlorine, bromine or fluorine are particularly useful in forming fire retardant coating compositions.

Anhydrides in which $R^2$ is a carbocyclic radical are useful, such as hexahydrophthalic anhydride, which has the following formula

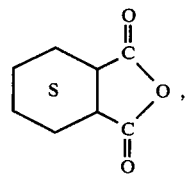

tetrahydrophthalic anhydride which has the following formula

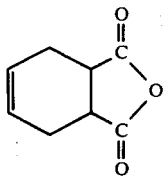

or

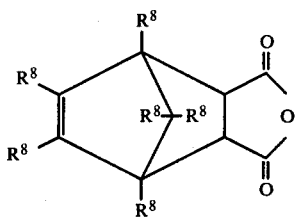

where $R^8$ is either chlorine, bromine or fluorine. The preferred compound is chlorendic anhydride in which $R^8$ is chlorine.

The glycidyl ester used for forming Ester Group (B) has the formula

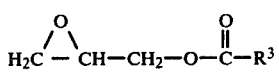

where $R^3$ is a saturated aliphatic hydrocarbon group containing 1–26 carbon atoms, or $R^3$ is an ethylenically unsaturated aliphatic hydrocarbon radical of 12–18 carbon atoms derived from a drying oil fatty acid.

Preferred for use because of the quality of the product obtained are esters where $R^3$ is a tertiary saturated aliphatic hydrocarbon group of the structure

where $R^5$ is —$CH_3$ and $R^6$ and $R^7$ are alkyl groups of 1–12 carbon atoms.

One particularly preferred glycidyl ester of this group because it imparts acid and alkali resistance to the final coating is a mixed glycidyl ester described in U.S. Pat. No. 3,275,583, issued Sept. 27, 1966, and is manufactured and sold by the Shell Chemical Company as "Cardura" E ester. This glycidyl ester is of a synthetic tertiary carboxylic acid and has the general formula

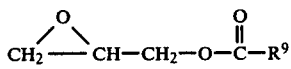

where $R^9$ is a tertiary aliphatic hydrocarbon group of 8–10 carbon atoms.

When a coating composition of this invention is to be an air dried composition, $R^3$ can be an ethylenically unsaturated aliphatic hydrocarbon radical of 12–18 carbon atoms. This glycidyl ester is obtained by esterifying the acid chloride of one of the well known drying oil fatty acids, such as oleic acid, linoleic acid, linolenic acid, oleostearic acid, and ricinoleic acid with glycidol. These acids are commonly found in tung oil, linseed oil, dehydrated castor oil and soya oil.

The preferred method for forming the above unsaturated glycidyl esters is to react the sodium salt of the fatty acid with epichlorohydrin. The reaction is as follows:

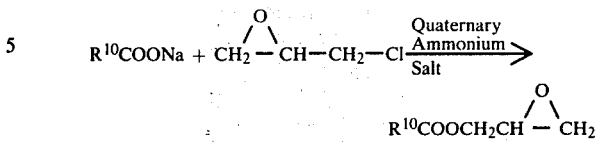

where $R^{10}$ is from one of the aforementioned drying oil fatty acids.

Preferably, the polymer used to form the novel coating composition of this invention has 30 to 60% of its total weight contributed by Ester Groups (A) and (B). Also, these groups are present in the polymer at a molar ratio of ester Group (A) to Ester Group (B) of about 1:1.5 to about 1:2.5, and preferably, in a ratio of about 1:2.

One method for preparing this hydroxyl containing polymer used in this invention is to first form Ester Group (B) by reacting in about an equal molar ratio the above hydroxyalkyl monomers, the anhydride and the glycidyl ester. This esterification product is then reacted with the backbone monomers and the hydroxyalkyl monomers, which form Ester Group (A), to form the polymer.

As a typical example, a hydroxy alkyl acrylate, aromatic anhydride and a glycidyl ester are charged into a reaction vessel with a suitable solvent, such as toluene, xylene, acetone or an aromatic solvent and the mixture is heated to its reflux temperature which is about 80° to 200° C., for about 30 minutes to 3 hours. The backbone constituents of the polymer, such as styrene/methyl methacrylate and a hydroxy-alkyl acrylate with a suitable polymerization catalyst, such as tertiary butyl peroxide, are then slowly added over a 1–4 hour period. The reaction mixture is heated to its reflux temperature which is about 80° to 200° C. for about 30 minutes to 5 hours, preferably 2–4 hours until a polymer is formed that has the desired molecular weight, which is determined by the relative viscosity as described below. Additional solvent may then be added to dilute the polymer solution.

If the reaction rates of the monomer components used to form the polymer of the invention are suitable, all of the monomers can be charged into a reaction vessel with a suitable solvent and polymerization catalyst and heated to the reflux temperature which is about 80° to 200° C. for 60 minutes to 5 hours.

Another method of preparing the polymer used in this invention is to charge the anhydride, for example, phthalic anhydride, into a reaction vessel with a suitable solvent and heat the mixture for about 30 minutes to effect solution of the anhydride. The other monomer constituents with a suitable polymerization catalyst are then slowly added over a 1–4 hour period into the reaction vessel while maintaining a reflux temperature which is about 80°–200° C. After the above ingredients have been added, the reaction mixture is maintained at its reflux temperature for an additional 30 minutes to about 5 hours.

Suitable solvents which are used to prepare the polymer used in this invention are toluene, xylene, butyl acetate, acetone, methyl isobutyl ketone, methyl ethyl ketone, and other aliphatic, cycloaliphatic, and aromatic hydrocarbons, esters, ethers, ketones, and other solvents which are non-reactive with the monomers used to form the polymer such as are conventionally used in coating compositions.

Suitable polymerization catalysts that are used in the process to prepare the polymer used in this invention are tertiary butyl peroxide, cumene hydroperoxide, azobisisobutyronitrile and the like. To prepare the Ester Group (B), esterification catalyst, such as quaternary bases or salts such as benzyltrimethylammonium hydroxide, benzyltrimethylammonium chloride, octadecyltrimethylammonium chloride, or an amine, such as triethylamine, can be used.

The hydroxyl containing polymer used in this invention preferably has a relative viscosity of 0.9 to 1.4. The "relative viscosity" is the value obtained by dividing the efflux time of a solution of the polymer by the efflux time of the solvent used to form the above polymer solution. The efflux times are measured according to the procedure of ASTM-D-445-46-T, Method B, using as the polymer solution 0.25 gram of the polymer in 50 cubic centimeters of ethylene dichloride as the solvent. The efflux times are measured at 25° C. in a standard apparatus, sold under the designation of a modified Ostwald Viscometer.

The hydroxyl containing polymer formed by one of the aforementioned processes is in a solution and is suitable for direct use to form the coating composition of this invention. The hydroxyl containing polymer solution is blended with a solution of the polyisocyanate and a rheology control agent to form the improved coating composition of this invention. The molar ratio of isocyanate to hydroxyl is maintained between about 0.5–1.5 and, preferably, maintained at from 1.0 to 1.2 molar ratio.

The rheology control agent utilized in the coating composition comprises 0.1–30% by weight of the composition and preferably 0.5–8%. When the rheology control agent is a fumed silica, it is present as 0.1–5%, and preferably 0.8–1.5%, by weight, of the composition.

The rheology control agents utilized in this invention can be inorganic or organic (polymeric). The inorganic rheology control agents must have a particle size less than 1 micron. The polymeric rheology control agents do not have to be quite as small as the inorganics since the former are not inert to the solvents present in the coating composition, i.e., they swell and control the composition's rheology through a different mechanism.

The fumed silica utilized consists of submicroscopic particles having a total surface area of 200–400 square meters per gram. It is at least 99.8% silicon dioxide by weight (on a moisture free basis); it exists in three-dimensional branched chain aggregates and has a hydrophilic surface which is capable of hydrogen bonding.

It is this hydrophilicity of some of the rheology control agents such as fumed silica that enhances their ability to absorb certain hydrogen bonding agents. The optional use of such hydrogen bonding agents is also contemplated within this invention. Among such hydrogen bonding agents are amines, water, alcohols, glycols, sulfonated castor oil, and the like. A preferred hydrogen bonding agent is triethanol amine. It is thought that the use of such agents thickens the rheology control agents through hydrogen bonding. Under high shear spraying this hydrogen bonded structure breaks down to a lower viscosity composition which then rapidly recovers to a high viscosity upon reaching the surface to be coated. The hydrogen bonding agents can be present as 0.3%, and preferably 0.01–0.5%, by weight of the coating composition. When triethanol amine is used it can be present from 0.01 to 0.15% by weight.

Among the fumed silicas a preferred one is "Cab-O-Sil" M-5 (available from the Cabot Corporation) having a nominal particle size, assuming spheric particles, of 0.014 micron.

Another rheology control agent is attapulgus clay. These clay products are naturally sorbent crystals having an approximate chemical analysis as follows: silica, 68%; alumina, 12%; magnesium oxide, 11%; iron oxide, 5%; and other minor components. A preferred attapulgus clay is "Attagel" 150 (available from Engelhard Minerals and Chemical Corporation), having an average particle size of 0.12 micron where the particles have a needle-like shape. The attapulgus clay can be present from 0.1–15% and preferably 1.0–2.5% by weight of the composition.

Another rheology control agent is a mixed aluminum-magnesium silicate which can be present from 0.1–15%, and preferably 1.0–2.5% by weight. These are available from the National Lead Co. and are commonly known as "Bentone"; are chemically neutral, are shaped as flat plates, and are considerably less than 1 micron size in their maximum dimension.

A different type of rheology control agent is a copolymer of acrylonitrile (AN) and methyl acrylate (MA) of high AN content. A preferred copolymer has the following composition: AN/MA//94/6 (% by weight). These copolymers are utilized in a finely ground form to an average particle size of approximately 150 microns and are present from 0.1–30%, and preferably 3–8%, by weight of the coating composition.

Yet a different type of rheology control agents are acrylic polymers known as modified microgels. These modified microgels are described in U.S. Pat. No. 3,895,082, issued July 15, 1975 to S. Hochberg, the relevant portions of which are hereby incorporated by reference. A typical microgel is prepared by polymerizing, in a suitable reaction medium, a mixture of reactive compounds which contains, in each 100 parts of weight thereof about 75–99 parts of a monomer system selected from the group consisting of $C_1$ to $C_8$ alkylacrylate and a mixture consisting of a $C_1$ to $C_8$ alkyl acrylate with up to 25% by weight of said mixture of one or more monoethylenically unsaturated monomers selected from the group consisting of styrene, acrylonitrile, methacrylonitrile, and methacrylic acid; up to about 24 parts of allyl methacrylate; about 1–15 parts of a cross-linking agent, other than allyl methacrylate, having at least two polymerizable ethylenic double bonds per molecule, selected from the groups consisting of ethylene glycol dimethacrylate, tetramethylene glycol diacrylate, trimethylol propane triacrylate, tetraethylene glycol dimethacrylate, methylene bisacrylamide, methylene bismethacrylamide, divinyl benzene, vinyl methacrylate, vinyl crotonate, vinyl acrylate, vinyl acetylene, trivinyl benzene, glycerine trimethacrylate, pentaerythritol tetramethacrylate, triallyl cyanurate, divinyl acetylene, divinyl ethane, divinyl sulfide, divinyl sulfone, triethylene glycol dimethacrylate, diallyl cyanamide, glycol diacrylate, ethylene glycol divinyl ether, diallyl phthalate, divinyl dimethyl silane, and glycerol trivinyl ether; and grafting to the reactive compounds a second portion composed of a polyalkyl methacrylate of 1–8 carbon atoms in the alkyl group. A preferred example of a modified microgel is a polymeric composition having a core polymer of the approximate composition: 2-ethylhexyl acrylate/styrene/ethylene glycol diacrylate/allyl methacrylate//75/20/2.5/2.5 (% by weight); to which methyl methacrylate is grafted in a ratio of core to graft of about 67 to 33 by weight.

In practice, a two component sytem is used, i.e., the solution of a polyisocyanate is in one package and the solution of the hydroxyl containing polymer, formulated with the rheology control agent and other additives, is in a separate package. The two components are thoroughly mixed before applying the coating composition. This is necessary since in most cases, the "pot life" of the system is relatively short since the reaction between the hydroxyl containing polymer and the polyisocyanate occurs at a rapid rate even at room temperature. Since, however, there is a room temperature pot life of 8-10 hours, the improved composition of this invention can be handled as a one-package system for an entire working day.

A resulting improved coating composition contains about 5-60% by weight of a polymer blend, 0.1-30% by weight of a rheology control agent, and a solvent for the resin blend. Additional solvents which are commonly used are high solvency hydrocarbons, alcohols, esters, ketones or ethers and if desired, plasticizers may be added to the coating composition.

Preferably, about 0.01-1.0% by weight, based on the weight of the polymer blend of the coating composition of this invention, of a reaction catalyst can be added to the coating composition. In a two component system, the catalyst can be added to either the polyisocyanate solution or the dispersion of the hydroxyl containing polymer and the rheology control agent. Typically useful catalysts are organo tin catalysts, such as dibutyl tin dilaurate, dibutyl tin di-2-ethylhexoate, stannous octoate, stannous oleate, and the like; zinc naphthenate, vanadium acetyl acetonate, zirconium acetyl acetonate and the like.

Since the "pot life" of the novel coating composition of this invention may be short, pot life extenders can be added such as those shown in the U.S. Pat. No. 3,314,834, issued Apr. 18, 1967, in particular 2,4-pentanedione. Also, the pot life of the novel coating compositions can be lengthened significantly by using from 0.01% to about 1%, by weight of the polymer blend, of a tertiary amine catalyst instead of one of those mentioned above. Illustrative of amines which can be used are triethylene diamine, heptamethylisobiguanide, triethylamine, pyridine, dimethylaniline, and methyl morpholine. Triethylenediamine and heptamethylisobiguanide are preferred.

A one-package coating composition can be prepared using a polyisocyanate whose isocyanate groups have been blocked with a blocking agent such as methyl ethyl ketoxime. This eliminates the need for mixing the prepolymer and isocyanate solutions just before use. When this composition is applied and baked at a temperature of 150°-160° C., the blocking agent is released, permitting the isocyanate to react with the hydroxyl containing polymer.

To provide the improved coating composition with other characteristics which may be desirable under some conditions, other compatible polymers can be blended with the coating composition, such as polymethyl methacrylate, polystyrene, polyvinylpyrrolidone and the like. For example, 20-40% by weight, based on the weight of the polymer blend of the coating composition, of polymethyl methacrylate gives the coating composition a decreased drying time and an increase in gloss and appearance.

For most uses, the improved coating composition formed from polymers used in this invention is pigmented. The pigment to binder ratio can vary from about 1-150, depending on the pigment used. By binder, it is meant the film-forming materials in the coating composition. Typical pigments which can be used are metallic oxides, preferably titanium dioxide, zinc oxide, and the like, metal hydroxides, metal flakes, chromates, such as lead chromate, sulfides, sulfates, carbonates, carbon black, talc, china clay, organic dyes and lead, iron blues, organic reds, maroons, and the like, organic dyes and lakes, etc.

The pigments can be introduced into the coating composition by first forming a mill base with the hydroxyl containing polymer and the rheology control agent by conventional sand-grinding or ball milling techniques, and then blending the mill base with the film-forming polymers as shown in the following examples.

The improved coating compositions of this invention can be applied to a variety of substrates, for example, metal, wood, masonry, cement, glass, plastics, such as polypropylene, polystyrene, copolymers of styrene, such as styrene/butadiene/acrylonitrile and the like, by any of the usual application methods, such as spraying, dipping, brushing, flow coating, and the like. These coatings can be air dried or baked at a relatively low temperature of about 50°-120° C. for about 15 minutes-2 hours or air dried. The resulting coating is about 0.5-5 mils thick, preferably 1-3 mils thick and can be rubbed or polished in accordance with conventional techniques, if desired, to improve smoothness or apparent gloss or both. The improved coating composition of this invention gives a hard, durable, scratch and grease resistant, glossy coating which is suitable for auto bodies, truck bodies, repair of auto bodies and truck bodies, airplanes, railroad equipment, appliances, vending machines, outdoor equipment and the like. The coatings are bubble-free when applied over zinc rich primers and are resistant to severe weather and to corrosive environment.

Preferably, the improved coating composition of this invention is applied over a suitable treated or primed metal substrate. For example, steel substrates treated with zinc phosphate, can be used. Also, metal substrates coated with typical alkyd primers or epoxy primers pigmented with iron oxide, carbon black, titanium dioxide and the like can be used. Also, the composition can be used directly over galvanized steel to form a durable coating.

The following Examples illustrate the invention. All quantities are on a weight basis unless otherwise indicated.

EXAMPLE 1

(A)

A polymer solution is formed by reacting the following ingredients:

|  | Parts By Weight |
|---|---|
| Portion 1 | |
| Xylene | 415.39 |
| Hydroxyethyl acrylate | 218.50 |
| Phthalic anhydride | 269.50 |

-continued

| | Parts By Weight |
|---|---|
| "Cardura" E ester - (a mixed ester described in U.S. Pat. No. 3,275,583, issued September 27, 1966, and is a glycidyl ester of a synthetic tertiary carboxylic acid of the formula 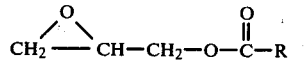 where R is a tertiary aliphatic hydrocarbon group of 8-10 carbon atoms) | 481.25 |
| Portion 2 | |
| Xylene | 621.15 |
| Portion 3 | |
| Styrene | 567.88 |
| Methyl methacrylate | 288.74 |
| Hydroxyethyl acrylate | 99.13 |
| Tertiary butyl peroxide | 17.33 |
| Portion 4 | |
| Xylene | 363.13 |
| Cellosolve acetate | 158.00 |
| Total | 3500.00 |

Portion 1 is charged into a reactor equipped with a reflux condenser and is heated to a reflux temperature and is held at this temperature for about 1 hour. Portion 2 is then added and the mixture is heated to its reflux temperature. Portion 3 is premixed and slowly added over a 3-hour period while maintaining the reflux condition and then the reaction mixture is held at the reflux temperature for an additional 3 hours. The heat is removed from the reaction vessel and Portion 4 is added.

The resulting polymer solution has a solids content of about 55% and a Gardner-Holdt viscosity of about X and the polymer has an acid number less than 10. The polymer is the copolymerization and esterification product of the following reactants:

| | Parts by Weight |
|---|---|
| Styrene | 29.5 |
| Methyl methacrylate | 15.0 |
| Hydroxyethyl acrylate | 16.5 |
| Phthalic anhydride | 14.0 |
| "Cardura" E ester | 25.0 |
| Total | 100.0 |

(B)

A paint is formulated by mixing the following ingredients:

| | Parts by Weight |
|---|---|
| Portion 1 | |
| Polymer solution from (A) above (55% polymer solids) | 39.30 |
| Methyl ethyl ketone | 10.42 |
| Aliphatic hydrocarbon solvent (boiling point 155°180° C.) | 3.68 |
| Mixed dimethyl esters (of succinic, glutaric, and adipic acids, 20:55:25 by weight) | 5.87 |
| Titanium dioxide pigment (rutile, prepared by the chloride process) | 26.51 |
| Talc | 12.68 |
| "Cab-O-Sil" M-5 | 1.47 |
| Triethanol amine | 0.07 |
| Portion 2 | |
| Portion 1 | 71.63 |
| Dibutyltin dilaurate (0.2% solution in ethyl acetate) | 1.33 |
| Silicone fluid, 5000 centistokes at 25° C. (1% solution in an aromatic hydrocarbon solvent, boiling point 150°-190° C.) | 0.08 |
| Polymer solution from (A) above (55% solids) | 25.34 |
| Methyl Ethyl Ketone | 1.62 |
| Portion 3 | |
| "Desmodur N" solution (75% solution of hexamethylene diisocyanate biuret in a mixture of xylene/cellosolve acetate// 50/50) | 10.79 |
| Portion 2 | 89.21 |

The above ingredients of Portion 1 are premixed and charged into a conventional sand grinding mill and ground to about 0.75 mil fineness. Portion 2 is then prepared and finally Portion 2 is blended with the biuret as indicated in Portion 3.

The final composition has a pigment to binder ratio of 75/100, a PVC of 20, and a Stormer viscosity of 70 Krebs units. A film is deposited on a steel panel by spraying, having a dry film thickness of 4-5 mils. The film is allowed to cure at room temperature for 2 weeks before testing. After 1000-hour exposure to salt spray (ASTM B-117-64) the film shows excellent corrosion, blistering, and rust resistance and also shows no blistering when immersed for 5 days into either a 50% aqueous $H_2SO_4$ or 10% aqueous $HNO_3$.

EXAMPLE 2

| | Parts By Weight |
|---|---|
| Portion 1 | |
| Mixed dimethyl esters (described in Example 1) | 3.59 |
| Methyl ethyl ketone | 8.59 |
| Aliphatic hydrocarbon solvent (boiling point 155°-180° C.) | 2.26 |
| Polymer solution (from Example 1(A)) | 46.14 |
| "Cab-O-Sil" M-5 | 1.25 |
| Triethanol amine | 0.05 |
| Talc | 9.83 |
| Titanium dioxide (rutile) | 16.22 |
| Dibutyltin dilaurate (0.2% solution in ethyl acetate) | 1.09 |
| Silicone fluid, 5000 centistokes at 25° C. (1% solution in an aromatic hydrocarbon solvent, boiling point 150°-190° C.) | 0.05 |
| Portion 2 | |
| Portion 1 | 89.43 |
| "Desmodur N" solution (75% solution of hexamethylene diisocyanate biuret in a mixture of xylene/cellosolve acetate// 50/50) | 10.57 |

The ingredients of Portion 1 are premixed and charged into a sand grinding mill and ground to about 0.75-mil fineness. Portion 2 is then prepared by blending Portion 1 and the biuret.

The final composition has a pigment to binder ratio of 84/100, a PVC of 22.3, and a Stormer viscosity of 83 Krebs units. A 4-5 mil thick dry film is deposited on a steel panel by spraying and cured at room temperature for 2 weeks. The cured film has an ultimate pencil hardness (ASTM D-3363-74) of 2H and shows excellent corrosion, blistering, and rust resistance upon exposure to salt-spraying. The film also shows no blistering after a 5-day immersion in 50% aqueous solution of sulfuric acid or 10% aqueous solution of nitric acid. In accelerated weathering (600 hours, simulating Florida weather; equipment described in U.S. Pat. No. 3,501,942) the 60° angle specular gloss (ASTM D-523-67) changed only by 2 (from 59 to 57).

EXAMPLE 3

(A)

|  | Parts By Weight |
|---|---|
| Portion 1 | |
| Polymer solution from Example 1(A) | 17.50 |
| Cellosolve acetate | 13.02 |
| "Cab-O-Sil" M-5 | 0.09 |
| Titanium Dioxide (rutile) | 65.00 |
| Aliphatic hydrocarbon solvent (boiling point 155°-180° C.) | 4.39 |
| Portion 2 | |
| Polymer solution from Example 1(A) | 55.36 |
| Cellosolve acetate | 29.76 |
| Acrylonitrile/methyl acrylate//94/6 (average particle size: 150 microns) | 14.88 |
| Portion 3 | |
| Portion 1 | 25.01 |
| Portion 2 | 43.13 |
| Polymer solution from Example 1(A) | 30.18 |
| Dibutyltin dilaurate (0.2% solution in ethyl acetate) | 1.61 |
| Silicone fluid, 5000 centistokes at 25° C. (1% solution in aromatic hydrocarbon solvent, boiling point 150°-190° C.) | 0.07 |

Portion 1 is sand milled, portion 2 is ground to 0.2 mil fineness in a steel ball mill, and the ingredients of portion 3 are blended into a uniform dispersion.

(B)

An 88.56-gram quantity of portion 3 is blended with the above described "Desmodur N" solution, 11.44 grams, to obtain a coating composition having a P/B ratio of 53.7/100, a PVC of 20.9, and a Stormer viscosity of 70 Krebs units. Spraying and curing for 2 weeks at room temperature provides a 4-5 mil dry film which is resistant to salt-spray testing and shows no blistering after 5 days in strongly corrosive aqueous acid solution and after 7 days in 5% aqueous sodium hydroxide solution.

EXAMPLE 4

(A)

|  | Parts By Weight |
|---|---|
| Portion 1 | |
| Cellosolve acetate | 14.88 |
| Aliphatic hydrocarbon solvent (boiling point 155°-180° C.) | 5.02 |
| "Cab-O-Sil" M-5 | 0.1 |
| Polymer solution from Example 1(A) | 20.0 |
| Titanium dioxide (rutile) | 60.0 |
| Portion 2 | |
| Aliphatic hydrocarbon solvent (boiling point 155°-180° C.) | 6.71 |
| Methyl ethyl ketone | 19.34 |
| Polymer solution from Example 1(a) | 58.93 |
| "Attagel" 150 | 13.34 |
| Silicone fluid, 5000 centistokes at 25° C. (1% solution in an aromatic hydrocarbon solvent, boiling point 150°-190° C.) | 1.68 |

Portion 1 and Portion 2 are sand milled separately.

(B)

|  |  |
|---|---|
| Portion 2 | 11.27 |
| Cellosolve acetate | 4.77 |
| Aliphatic hydrocarbon solvent (boiling point 155°-180° C.) | 1.26 |
| N-methyl ethanol amine | 0.19 |
| Polymer solution from Example 1(A) | 23.85 |
| Cellulose acetate butyrate [available from Eastman Chemical as EAB-531-1 (57% butyrate, no acetate, 1.78% free hydroxyl groups); 27.5% solution in toluene/acetone//2/1] | 4.91 |
| Portion 1 | 44.50 |
| "Desmodur N" solution | 9.25 |

The above listed components are blended to obtain a coating composition having a P/B ratio of 94/100, a PVC of 22.2, and a Stormer viscosity of 90 Krebs units.

The composition is sprayed on a steel panel and is allowed to cure for 2 weeks at room temperature. The cured film shows excellent 60° angle specular gloss of 80.

What is claimed is:

1. An improved thermosetting coating composition of controlled rheology containing 5-60% by weight of a polymer blend and a solvent for the polymer blend in which the blend consists essentially of
   (I) an organic polyisocyanate; and
   (II) polymer having a backbone of polymerized ethylenically unsaturated monomers and having ester groups attached directly to its backbone, said ester groups comprising about 10 to 75% of the total weight of the polymer and consisting essentially of

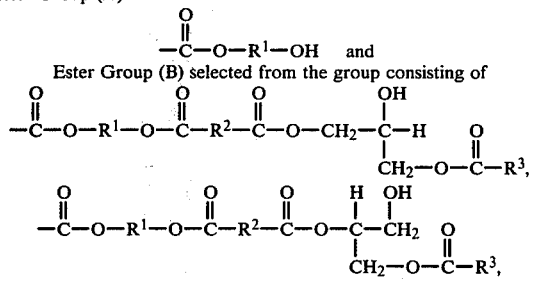

and mixtures thereof, wherein the molar ratio of Ester Group (A) and Ester (B) is from about 1:1.5 to 1:2.5; and wherein $R^1$ is a saturated hydrocarbon radical containing 2-10 carbon atoms;

$R^2$ is selected from the group consisting of alkylene, vinylene, aromatic, carbocyclic, and heterocyclic radicals, and $R^3$ is selected from the group consisting of a saturated aliphatic hydrocarbon radical having 1 to 26 carbon atoms and an ethylenically unsaturated aliphatic hydrocarbon radical having 12 to 18 carbon atoms, wherein the improvement comprises:

a rheology control agent selected from the group consisting of
  a blend of fumed silica, in an amount of 0.1-5% by weight, based on the weight of the coating composition, consisting essentially of silicon dioxide having a total surface area of 200-400 square meters per gram and having a hydrophilic surface which is capable of hydrogen bonding, and an amine hydrogen bonding agent in an amount of 0.01-0.5% by weight, based on the weight of the coating composition;

an acrylonitrile/methyl acrylate polymer having a high acrylonitrile content in an amount of 0.1-30% by weight, based on the weight of the coating composition a modified microgel in an amount of 0.1-30% by weight, based on the weight of the coating composition, said microgel prepared by polymerizing, in a suitable reaction medium, a mixture of reactive compounds which contains, in each 100 parts of weight thereof about 75-99 parts of a monomer system selected from the group consisting of $C_1$ to $C_8$ alkylacrylate and a mixture consisting of a $C_1$ to $C_8$ alkyl acrylate with up to 25% by weight of said mixture of one or more monoethylenically unsaturated monomers selected from the group consisting of styrene, acrylonitrile, methacrylonitrile, and methacrylic acid; up to about 24 parts of allyl methacrylate; about 1-15 parts of a cross-linking agent, other than allyl methacrylate, having at least two polymerizable ethylenic double bonds per molecule, selected from the groups consisting of ethylene glycol dimethacrylate, tetramethylene glycol diacrylate, trimethylol propane triacrylate, tetraethylene glycol dimethacrylate, methylene bisacrylamide, methylene bismethacrylamide, divinyl benzene, vinyl methacrylate, vinyl crotonate, vinyl acrylate, vinyl acetylene, trivinyl benzene, glycerine trimethacrylate, pentaerythritol tetramethyacrylate, triallyl cyanurate, divinyl acetylene, divinyl ethane, divinyl sulfide, divinyl sulfone, triethylene, glycol dimethacrylate, diallyl cyanamide, glycol diacrylate, ethylene glycol divinyl ether, diallyl phthalate, divinyl dimethyl silane, and glycerol trivinyl ether; and grafting to the reactive compounds a second portion composed of a polyalkyl methacrylate of 1-8 carbon atoms in the alkyl group.

2. The composition of claim 1 containing a blend of 0.1-5% by weight based on the weight of the coating composition, of fumed silica having a particle size less than 1 micron and 0.01-0.5% by weight, based on the weight of the coating composition, of an amine hydrogen bonding agent.

3. The composition of claim 1 containing 0.1-5% by weight, based on the weight of the coating, of attapulgus clay having a particle size of less than 3 in which the amine is a tertiary amine.

4. The composition of claim 1 containing 0.1-30% by weight, based on the weight of the coating composition, of a modified microgel.

5. The composition of claim 1 containing 0.1-30% by weight, based on the weight of the coating composition, of an acrylonitrile/methyl acrylate polymer of high acrylonitrile content.

6. The coating composition of claim 1 containing pigment.

7. The coating composition of claim 1 in which the organic polyisocyanate is selected from the group consisting of an aliphatic diisocyanate, cycloaliphatic diisocyanate, alkaryl diisocyanate, aralkyl diisocyanate, hetrocyclic diisocyanate, and aryl diisocyanate.

8. The coating composition of claim 1 in which the organic polyisocyanate is of the formula

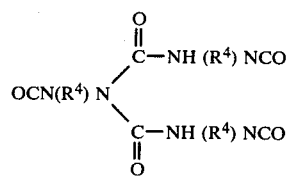

wherein $R^4$ is a divalent aliphatic hydrocarbon radical having 1-12 carbon atoms.

9. The coating composition of claim 8 which contains 0.01-1% by weight, based on the weight of said polymer blend, of a reaction catalyst.

10. The coating composition of claim 9 in which the reaction catalyst is an organo tin catalyst.

11. The coating composition of claim 8 in which the polymer has a backbone consisting essentially of polymerized monomers of an aromatic hydrocarbon having vinylene groups and esters of an $\alpha,\beta$-ethylenically unsaturated carboxylic acid, and in which $R^1$ is a saturated aliphatic hydrocarbon group having 2-4 carbon atoms, $R^2$ is selected from the group consisting of an aromatic radical and a carbocyclic radical, and $R^3$ is a tertiary aliphatic hydrocarbon group of 8-10 carbon atoms, and contains 0.01-1% by weight, based on the weight of the polymer blend, of a reaction catalyst.

12. The coating composition of claim 11 in which the polymer backbone consists essentially of styrene and an acrylic ester selected from the group consisting of an alkyl methacrylate, an alkyl acrylate, and mixtures thereof in which the alkyl group contains 1-12 carbon atoms; in which $R^1$ is a saturated hydrocarbon group having 2-4 carbon atoms, $R^2$ is an aromatic radical, $R^3$ is a tertiary hydrocarbon group having 8-10 carbon atoms, and $R^4$ is a saturated divalent aliphatic hydrocarbon radical having 6 carbon atoms.

13. The coating composition of claim 12 in which the ester groups comprise 30 to 60% by weight of the polymer and in which the acrylic ester is methyl methacrylate and in which $R^1$ is ethylene and $R^2$ is phenylene.

14. The coating composition of claim 1 in which the polymer has a backbone of acrylic esters selected from the group consisting of an alkyl methacrylate, an alkyl acrylate, and mixtures thereof, in which the alkyl group contains 1-12 carbon atoms, and in which $R^1$ is a saturated aliphatic hydrocarbon group having 2-4 carbon atoms, $R^2$ is selected from the group consisting of an aromatic radical and a carbocyclic radical, and $R^3$ is a tertiary aliphatic hydrocarbon group of 8-10 carbon atoms.

15. The coating composition of claim 14 in which the organic polyisocyanate is a biuret of the formula

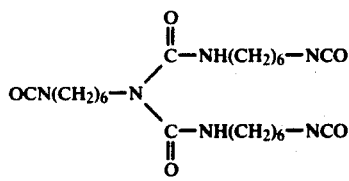

and contains 0.01-1% by weight, based on the weight of the polymer blend, of an organo tin reaction catalyst.

16. The coating composition of claim 6, wherein the NCO/OH ratio is 1.0-1.2 to 1.0, containing 3-8% by weight, based on the weight of the coating, of a modified microgel consisting essentially of a polymeric composition having a core polymer of 2-ethylhexyl acrylate/styrene/ethylene glycol diacrylate/allyl methacrylate to which methyl methacrylate is grafted.

17. The coating composition of claim 6, wherein the NCO/OH ratio is 1.0-1.2 to 1.0, containing 3-8% by weight, based on the weight of the coating, of an acrylonitrile/methyl acrylate//94/6 (% by weight) copolymer.